(12) United States Patent
Koniaris et al.

(10) Patent No.: US 7,509,504 B1
(45) Date of Patent: Mar. 24, 2009

(54) SYSTEMS AND METHODS FOR CONTROL OF INTEGRATED CIRCUITS COMPRISING BODY BIASING SYSTEMS

(75) Inventors: Kleanthes G. Koniaris, Palo Alto, CA (US); Stephen Lee, Los Altos, CA (US); Mark Hennecke, Cupertino, CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

(21) Appl. No.: 10/956,219

(22) Filed: Sep. 30, 2004

(51) Int. Cl.
*G06F 1/26* (2006.01)
(52) U.S. Cl. ................................. 713/300; 327/537
(58) Field of Classification Search ................. 713/300; 327/537
See application file for complete search history.

(56) References Cited

U.S. PATENT DOCUMENTS

| | | |
|---|---|---|
| 5,422,591 A | 6/1995 | Rastegar et al. |
| 5,610,533 A | 3/1997 | Arimoto et al. |
| 5,880,620 A | 3/1999 | Gitlin et al. |
| 5,973,526 A | 10/1999 | Dabral |
| 6,048,746 A | 4/2000 | Burr |
| 6,055,655 A | 4/2000 | Momohara |
| 6,087,892 A | 7/2000 | Burr |
| 6,091,283 A | 7/2000 | Murgula et al. |
| 6,097,242 A | 8/2000 | Forbes et al. |
| 6,218,708 B1 | 4/2001 | Burr |
| 6,218,892 B1 | 4/2001 | Soumyanath et al. |
| 6,218,895 B1 | 4/2001 | De et al. |
| 6,232,793 B1 | 5/2001 | Arimoto et al. |
| 6,232,827 B1 | 5/2001 | De et al. |
| 6,303,444 B1 | 10/2001 | Burr |
| 6,341,087 B1 | 1/2002 | Kunikiyo |
| 6,392,467 B1 | 5/2002 | Oowaki et al. |
| 6,411,156 B1 | 6/2002 | Borkar et al. |
| 6,456,157 B1 | 9/2002 | Forbes et al. |
| 6,484,265 B2 | 11/2002 | Borkar et al. |
| 6,489,224 B1 | 12/2002 | Burr |
| 6,518,826 B2 | 2/2003 | Zhang |
| 6,614,301 B2 | 9/2003 | Casper et al. |
| 6,621,325 B2 | 9/2003 | Hart et al. |
| 6,653,890 B2 | 11/2003 | Ono et al. |
| 6,731,157 B2 | 5/2004 | Fulkerson |
| 6,777,978 B2 | 8/2004 | Hart et al. |
| 6,784,722 B2 | 8/2004 | Tang et al. |
| 6,794,630 B2 | 9/2004 | Keshavarzi et al. |
| 6,812,758 B2 | 11/2004 | Gauthier et al. |
| 6,847,252 B1 | 1/2005 | Ono et al. |
| 6,858,897 B2 | 2/2005 | Chen |
| 6,864,539 B2 | 3/2005 | Ishibashi et al. |
| 6,912,155 B2 | 6/2005 | Sakurai et al. |
| 6,967,522 B2 | 11/2005 | Chandrakasan et al. |
| 7,095,269 B2 * | 8/2006 | Yamada ....................... 327/537 |
| 7,120,804 B2 * | 10/2006 | Tschanz et al. ............. 713/300 |
| 2002/0029352 A1 | 3/2002 | Borkar et al. |
| 2002/0030533 A1 | 3/2002 | De et al. |
| 2002/0033510 A1 | 3/2002 | Tomita |
| 2003/0005378 A1 | 1/2003 | Tschanz et al. |

(Continued)

*Primary Examiner*—Chun Cao (57) ABSTRACT

Systems and methods for control of integrated circuits comprising body-biasing systems. In accordance with a first embodiment of the present invention, a desirable power condition of a computer system comprising a microprocessor is determined. Body biasing voltage information corresponding to the power condition is accessed. A voltage supply coupled to a body terminal of the microprocessor is commanded to generate a voltage corresponding to the body biasing voltage information corresponding to the power condition.

21 Claims, 5 Drawing Sheets

U.S. PATENT DOCUMENTS

| | | |
|---|---|---|
| 2003/0063513 A1 | 4/2003 | Tsunoda et al. |
| 2003/0080802 A1 | 5/2003 | Ono et al. |
| 2003/0132735 A1 | 7/2003 | Fulkerson |
| 2004/0016977 A1 | 1/2004 | Miyazaki et al. |
| 2004/0021501 A1 | 2/2004 | Das et al. |
| 2004/0109354 A1 | 6/2004 | Wang et al. |
| 2004/0125644 A1 | 7/2004 | Komatsuzaki |
| 2004/0155696 A1 | 8/2004 | Gauthier et al. |
| 2004/0217372 A1 | 11/2004 | Chen |
| 2005/0225376 A1 | 10/2005 | Kin Law |
| 2005/0237083 A1 | 10/2005 | Bakker et al. |
| 2005/0280437 A1 | 12/2005 | Lewis et al. |

* cited by examiner

SYSTEMS AND METHODS FOR CONTROL OF INTEGRATED CIRCUITS COMPRISING BODY BIASING SYSTEMS

FIELD OF THE INVENTION

Embodiments in accordance with the present invention relate to systems and methods for control of integrated circuits comprising body-biasing systems.

RELATED APPLICATIONS

Co-pending commonly-owned U.S. patent application Ser. No. 10/958,218, filed Sep. 30, 2004, entitled "Systems and Methods for Integrated Circuits Comprising Multiple Body Bias Domains" to Koniaris and Burr, is hereby incorporated herein by reference in its entirety as reference material.

Co-pending commonly-owned U.S. patent application Ser. Nuo. 10/771,015, filed Feb. 2, 2004, entitled "Systems and Methods for Adjusting Threshold Voltage" to Masleid and Burr, is hereby incorporated herein by reference in its entirety as reference material.

Co-pending commonly-owned U.S. patent application Ser. No. 10/334,272 filed Dec. 31, 2002, entitled "Diagonal Deep Well Region for Routing Body-Bias Voltage for MOSFETs in Surface Well Regions" to Pelham and Burr, is hereby incorporated herein by reference in its entirety as reference material.

BACKGROUND

It is desirable to adjust or change operating characteristics, for example, maximum frequency of operation, leakage current, static power consumption, slew rate and the like, of transistors and more complex circuits of an integrated circuit after the integrated circuit has been produced.

SUMMARY OF THE INVENTION

Therefore, systems and methods for control of integrated circuits comprising body-biasing systems would be highly desirable.

Accordingly, systems and methods for control of integrated circuits comprising body-biasing systems are disclosed. In accordance with a first embodiment of the present invention, a desirable power condition of a computer system comprising a microprocessor is determined. Body biasing voltage information corresponding to the power condition is accessed. A voltage supply coupled to a body terminal of the microprocessor is commanded to generate a voltage corresponding to the body biasing voltage information corresponding to the power condition.

In accordance with another embodiment of the present invention, a computer system is disclosed comprising a plurality of data storage locations comprising body biasing voltage information corresponding to a plurality of power modes of the computer system. The system further comprises a voltage supply to generate a body biasing voltage for circuitry of the computer system according to the body biasing voltage information and circuitry to selectively couple the body biasing voltage information from one of the plurality of data storage locations corresponding to one of the plurality of power modes to the voltage supply.

DETAILED DESCRIPTION OF THE INVENTION

In the following detailed description of the present invention, systems and methods for control of integrated circuits comprising body-biasing systems, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

NOTATION AND NOMENCLATURE

Some portions of the detailed descriptions which follow (e.g., process 400) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "commanding" or "storing" or "dividing" or "computing" or "testing" or "calculating" or "determining" or "storing'" or "measuring" or "adjusting" or "generating" or "performing" or "comparing" or "synchronizing" or "accessing'" or "retrieving'" or "conveying'" or "sending" or "resuming'" or "installing" or "gathering" or the like, refer to the action and processes of a computer system, or similar electronic computing device" that manipulates and transforms data represented as physical (electronic) quantities within the computer system's registers and memories into other data similarly represented as physical quantities within the computer system memories or registers or other such information storage, transmission or display devices.

SYSTEMS AND METHODS FOR CONTROL OF INTEGRATED CIRCUITS COMPRISING BODY BIASING SYSTEMS

Embodiments in accordance with the present invention are described in the context of design and operation of integrated semiconductors. More particularly, embodiments of the present invention relate to systems and methods for control of integrated circuits comprising body-biasing systems. It is appreciated, however, that elements of the present invention may be utilized in other areas of semiconductor operation.

The following description of embodiments in accordance with the present invention is directed toward coupling a body-bias voltage to pFETs (or p-type metal oxide semiconductor field effect transistors [MOSFETS]) formed in surface N-wells and/or nFETs (or n-type MOSFETS) formed in surface P-wells when a p-type substrate and an N-well process are utilized. For example, the coupling can comprise a conductive sub-surface region of N-type doping, e.g., a deep N-well. It is to be appreciated, however, that embodiments in accordance with the present invention are equally applicable to coupling a body-bias voltage to nFETs (or n-type MOSFETS) formed in surface P-wells and/or pFETs (or p-type MOSFETS) formed in surface N-wells when an n-type substrate and a P-well process are utilized, e.g., comprising a conductive sub-surface region of p-type doping. Consequently, embodiments in accordance with the present invention are well suited to semiconductors formed in both p-type and n-type materials, and such embodiments are considered within the scope of the present invention.

Figure 1:
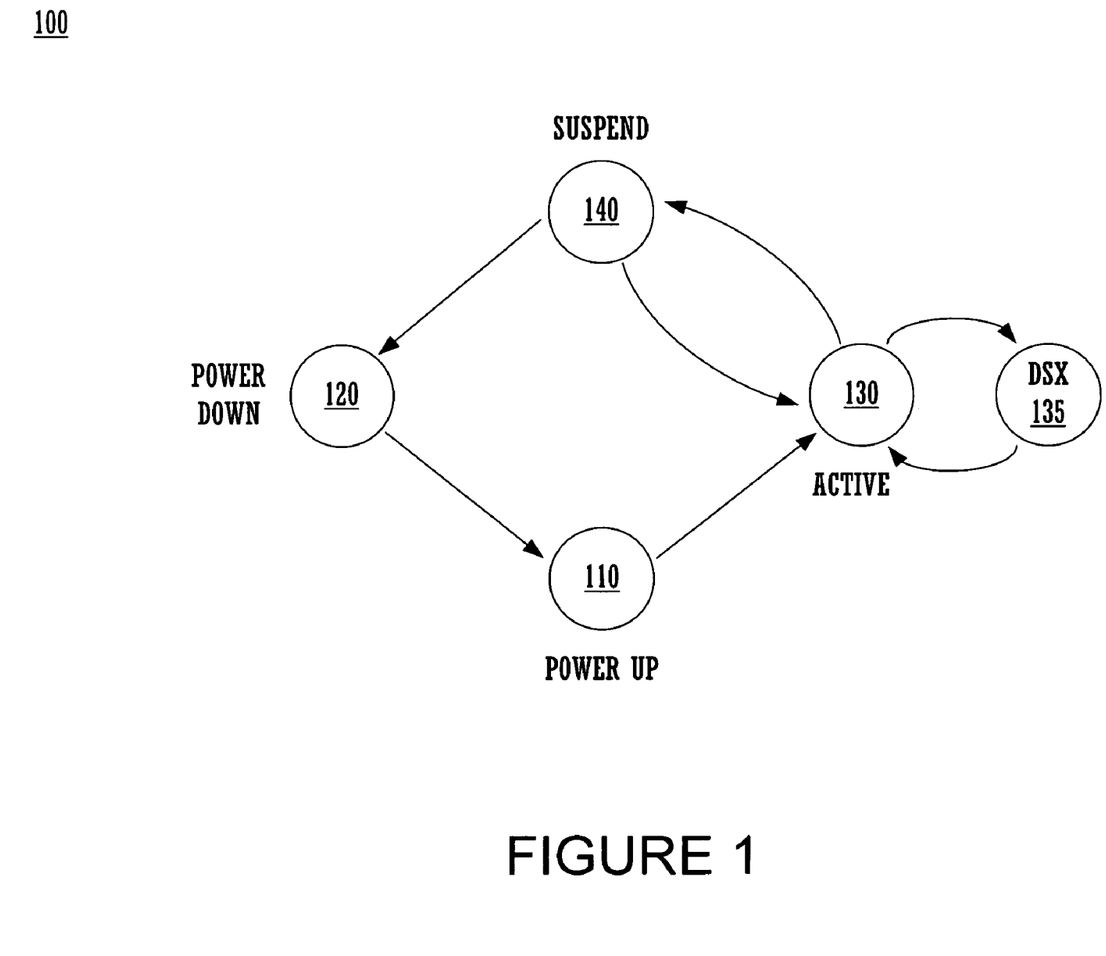
FIG. 1 illustrates an exemplary state diagram corresponding to a plurality of power modes utilized by systems comprising modern highly integrated circuits, in accordance with embodiments of the present invention.

FIG. 1 illustrates an exemplary state diagram 100 corresponding to a plurality of power modes utilized by systems comprising modern highly integrated circuits, e.g., a microprocessor-based computer system, in accordance with embodiments of the present invention. A given computer system can have other power states and/or other state transitions not illustrated in state diagram 100. For example, a computer system can generally be capable of transitioning from an active state directly to a power down state. It is to be appreciated that embodiments in accordance with the present invention are well suited to a variety of other power states and/or descriptions of power conditions utilized by electronic systems.

Management of power consumption is critical to the operation of modern microprocessors. More particularly, reducing power consumption is highly desired for microprocessors intended for mobile operations, e.g., a battery-powered laptop computer. Further, heat dissipation of an integrated circuit, e.g., a microprocessor, is closely related to power consumption of such an integrated circuit. For example, reducing heat dissipation of a microprocessor is highly advantageous for microprocessors utilized for a variety of applications including, for example, use in small form factor rack mounted servers, e.g., "blade" servers or server "farms," or in systems featuring arrays of multiple microprocessors utilized for parallel computing.

It is to be appreciated that the power modes or states illustrated in FIG. 1 affect the operation of a microprocessor or other integrated circuit, e.g., a graphics controller, to a point that such an integrated circuit can be generally "unaware" of which power state it is in, or of state transitions. More particularly, in general, such state transitions can render an integrated circuit incapable of performing its nominal operations. For example, in some power states and/or state transitions, a microprocessor may not reliably execute software instructions. Hence, in general, state machine 100 should not be implemented in software instructions implemented by a target microprocessor, but rather should be implemented via circuitry or other processors of a system that are external to the main functional circuitry of a general purpose processor.

State 110 corresponds to a "power up" state or mode of operation. Within state 110, operating voltage(s), e.g., Vdd, of an integrated circuit, e.g., a microprocessor, are in transition, increasing from a power off condition, e.g., typically Vdd equals zero volts, to a valid operating range, e.g., Vdd equals 3.3 volts plus or minus 10 percent.

State 120 corresponds to a "power down" state or mode of operation. Within state 120, operating voltage(s), e.g., Vdd, of an integrated circuit, e.g., a microprocessor, are in transition, decreasing from a valid operating range, e.g., Vdd equals 3.3 volts, to a power off condition, e.g., typically Vdd equals zero volts.

State 140 corresponds to a "suspend" state or mode of operation. Within state 140, operating voltage(s), e.g., Vdd, of an integrated circuit, e.g., a microprocessor, are off. For example, Vdd is zero volts. However, typically other circuitry of a system can remain in a powered on condition. For example, while in state 140, a microprocessor can be "off," e.g., without operating voltage applied, while main system memory, e.g., DRAM, continues to retain information in a self-refresh mode. State 140 can be utilized to enable a "fast" start from a low power condition, e.g., without having to load an operating system from disk-based storage and initialize it within main computer memory.

State 130 corresponds to an "active" state or mode of operation. Within state 130, operating voltage(s), e.g., Vdd, of an integrated circuit, e.g., a microprocessor, are within a valid operating range, e.g., Vdd equals 3.3 volts. In this state, an integrated circuit is capable of performing its nominal function. For example, a microprocessor is capable of executing software instructions. It is appreciated that various operating conditions of an integrated circuit, e.g., clock rate, operating voltage(s) and/or body biasing voltage(s) can be modified to adjust performance and/or power consumption characteristics within state 130.

State 135 corresponds to a "DSX" state or mode of operation. Within state 135, typically an integrated circuit, e.g., a microprocessor, maintains state information, e.g., contents of registers. However, the integrated circuit usually does not perform a function, e.g., a microprocessor does not execute software instructions. Operational voltage(s), e.g., Vdd, are typically applied to an integrated circuit. For example, state 135 differs from state 140 in at least this characteristic. However, it is possible that the operational voltage(s) applied are insufficient for normal operation. Rather, the applied operational voltage(s) can be sufficient to maintain at least some information characteristic of the state of the integrated circuit, e.g., register contents. An integrated circuit in a "DSX" mode may generally resume operation, e.g., transition to active state 130, more quickly than the same integrated circuit is capable of resuming operations from the suspend 140 state.

It is well known for complex electronic systems, e.g., a microprocessor-based computer system, to have multiple power rails. For example, many microprocessors utilize a first voltage for input/output signals and a second, typically lower, voltage for much of the functional circuitry, commonly known as the core. In addition, it is known to adjust one or both of these voltages based upon the functional needs of an integrated circuit. For example, if a microprocessor requires a high clock rate to complete a function, then it can be supplied with a relatively high operating voltage. In contrast, if the same microprocessor requires a low clock rate to complete a function, then it can be supplied with a relatively low operating voltage.

Further, U.S. patent application Ser. No. 10/771,015, filed Feb. 2, 2004, entitled "Systems and Methods for Adjusting Threshold Voltage" to Masleid and Burr, referenced above and incorporated herein by reference in its entirety, teaches adjusting body biasing voltages applied to circuitry of an integrated circuit.

Latchup is a well known deleterious thermal runaway condition that can occur in metal oxide semiconductors. A common triggering event resulting in latchup is an improper sequencing of power (voltage) supplies to an integrated circuit. As the number of such power supplies providing a variety of voltages, e.g., input/output voltages, core operating voltages, body biasing voltages and the like, increase, so too increase the opportunities for various deleterious effects related to power supply sequencing, for example, latch up. In addition, it is desirable to take advantage of an integrated circuit's increasing capabilities, e.g., adjustable body biasing voltages, at times during which operation of such an integrated circuit is unavailable and/or unstable.

Within "power up" state 110, it is desirable to apply particular body biasing voltage(s) to body-biased circuitry within the integrated circuit so as to avoid various deleterious effects, e.g., thermal runaway, e.g., "latch up," conditions that can occur during ramp up of a power supply voltage.

Similarly, within "power down" state 120, it is desirable to apply particular body biasing voltage(s) to body-biased circuitry within the integrated circuit so as to avoid various deleterious effects, e.g., thermal runaway, e.g., "latch up," conditions that can occur during ramp down of a power supply voltage.

Within "standby" state 140, operating voltage is removed from an integrated circuit. In general, it is desirable to adjust body-biasing voltage(s) supplied to an integrated circuit, for example to remove body-biasing voltage(s), for an integrated circuit in this state.

Within "active" state 130, operating voltage(s) within a valid operating range are applied to an integrated circuit. In general, it is desirable to adjust body-biasing voltage(s) supplied to an integrated circuit for an integrated circuit in this state. It is to be appreciated that other systems can also adjust body-biasing voltage(s) while a system is in this state. For example, body-biasing voltage(s) can be adjusted to correspond to microprocessor clock rates based upon finctional requirements of an "active" microprocessor.

Within "DSX" state 135, operating voltage(s) are applied to an integrated circuit. However, the integrated circuit generally does not perform a function in this state, for example, a microprocessor does not execute software instructions in this state. Yet, the integrated circuit will generally maintain some state information, e.g., register contents. Consequently, the applied operating voltage(s) may be outside of a valid operating range. A benefit of adjusting body-biasing voltage(s) is a capability to reduce static power consumption of an integrated circuit. As an integrated circuit in "DSX" state 135 is static, providing body-biasing voltage(s) to an integrated circuit corresponding to "DSX" state 135 can be highly advantageous.

Figure 2:
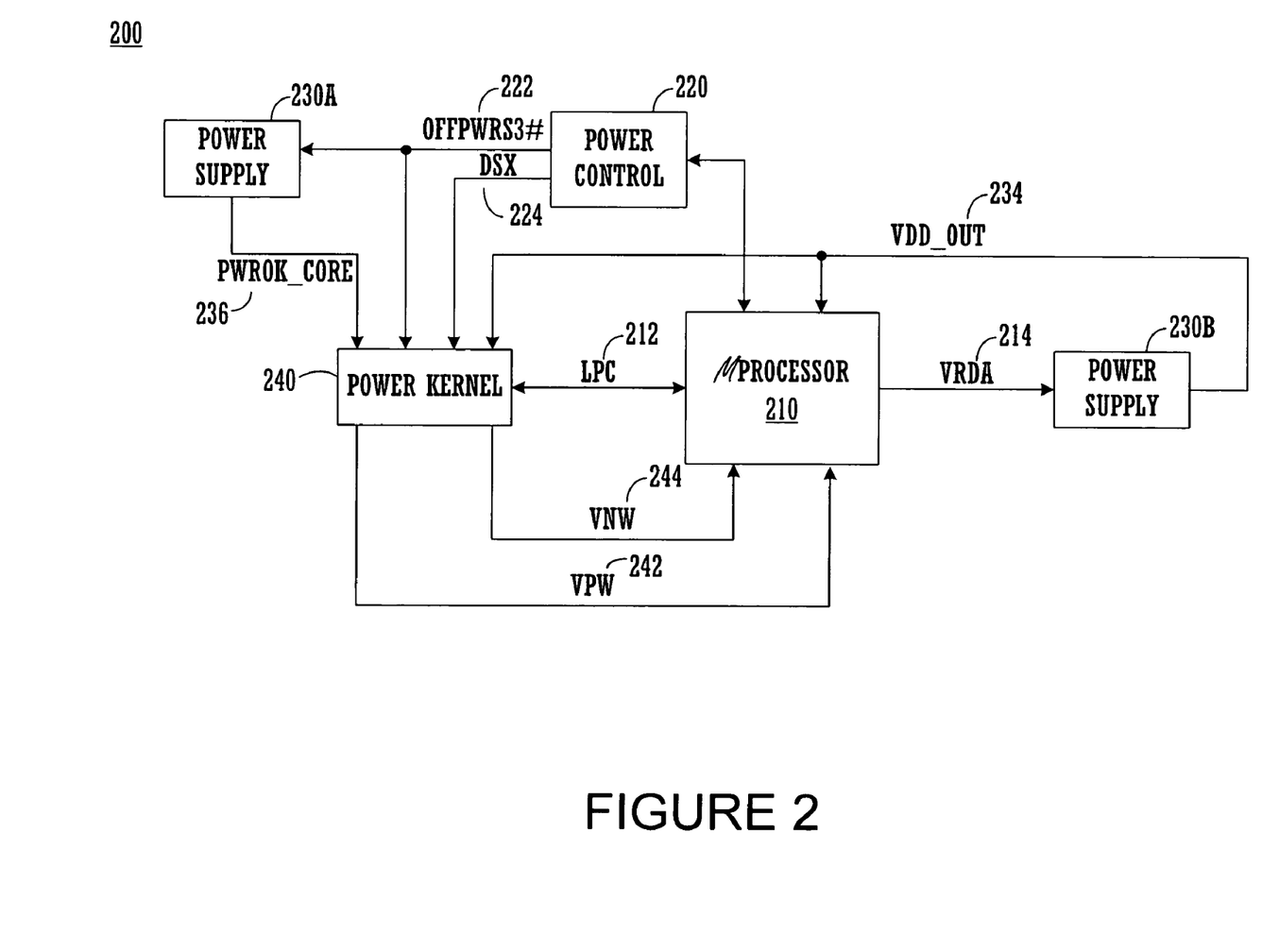
FIG. 2 illustrates a block diagram of a portion of a computer system, in accordance with embodiments of the present invention.

FIG. 2 illustrates a block diagram of a portion 200 of a computer system, in accordance with embodiments of the present invention. Computer system portion 200 comprises a microprocessor 210, a conventional power controller 220 and a variable output power supply 230. Variable output power supply 230 is depicted in two parts, or "split," to better illustrate its function and relationships to the other elements of computer system portion 200. It is appreciated that a computer system can comprise multiple power supplies, typically in the form of step-down regulators, and that such computers systems are well suited to embodiments of the present invention.

Many computer systems utilize a "Northbridge/Southbridge" architecture. A "southbridge" chip or chipset generally controls many peripheral finctions of a computer system, e.g., input/output, interrupt controller and the like. A common function of a "southbridge" is power control, and such a "southbridge" is one example of a power controller 220 that is well suited to embodiments in accordance with the present invention.

Power controller 220 plays a role in the power management of portion 200 of a computer system. For example, power controller 220 generates signal DSX 224 to indicate that the computer system should transition to DSX state 135. A signal OFFPWRS3# 222 indicates that power supply 230 should supply power to the microprocessor 210. Correspondingly, deassertion of OFFPWRS3# 222 indicates that power supply 230 should cease supplying power to the microprocessor 210.

Power supply 230 (230B) generates an operating voltage, Vdd_out 234 utilized by microprocessor 210. Microprocessor 210 is capable of operating over a range of operating voltages. Microprocessor 210 is able to communicate with power supply 230 via VRDA channel 214 to control the exact value of the operating voltage. For example, if it is determined that microprocessor 210 requires a first clock rate to achieve a desired level of performance, microprocessor 210 can command power supply 230 to supply microprocessor 210 with a corresponding first operating voltage. At another time, if it is determined that microprocessor 210 requires a second clock rate, e.g., a lower clock rate, to achieve a second, e.g., lower, level of performance, microprocessor 210 can command power supply 230 to supply microprocessor 210 with a corresponding second operating voltage. Signal PwrOK_core 236 indicates that the power supply voltage output, Vdd_out 234, is within specifications for operation of microprocessor 210.

Power kernel 240 produces two body-biasing voltages for microprocessor 210. Body biasing voltage Vnw 244 is provided to body terminals of p-type metal oxide semiconductor field effect transistors within microprocessor 210. Similarly, body-biasing voltage Vnw 244 is provided to body terminals of n-type metal oxide semiconductor field effect transistors within microprocessor 210. As discussed previously, it is generally desirable to provide microprocessor 210 with a variety of body biasing voltages corresponding to the varied power modes for the computer system.

For example, while microprocessor 210 is in the active state 130, it is capable of adjusting its operating voltage, as described previously. In conjunction with variations in operating voltage, it can be desirable to adjust body-biasing voltages Vnw 244 and/or Vpw 242. Microprocessor 210 is able to communicate with power kernel 240 via LPC channel 212 to control such changes to body biasing voltages.

It is appreciated that, in general, microprocessor 210 is unable to perform control functions, e.g., adjust an operating voltage and/or adjust a body biasing voltage, when microprocessor 210 is not executing software instructions. For example, in suspend state 140, microprocessor 210 operating voltage Vdd_out 234 is off, and microprocessor 210 is incapable of executing software instructions. In such circumstances, power kernel 240 determines the body biasing voltages, if any, applied to microprocessor 210.

Figure 3A:
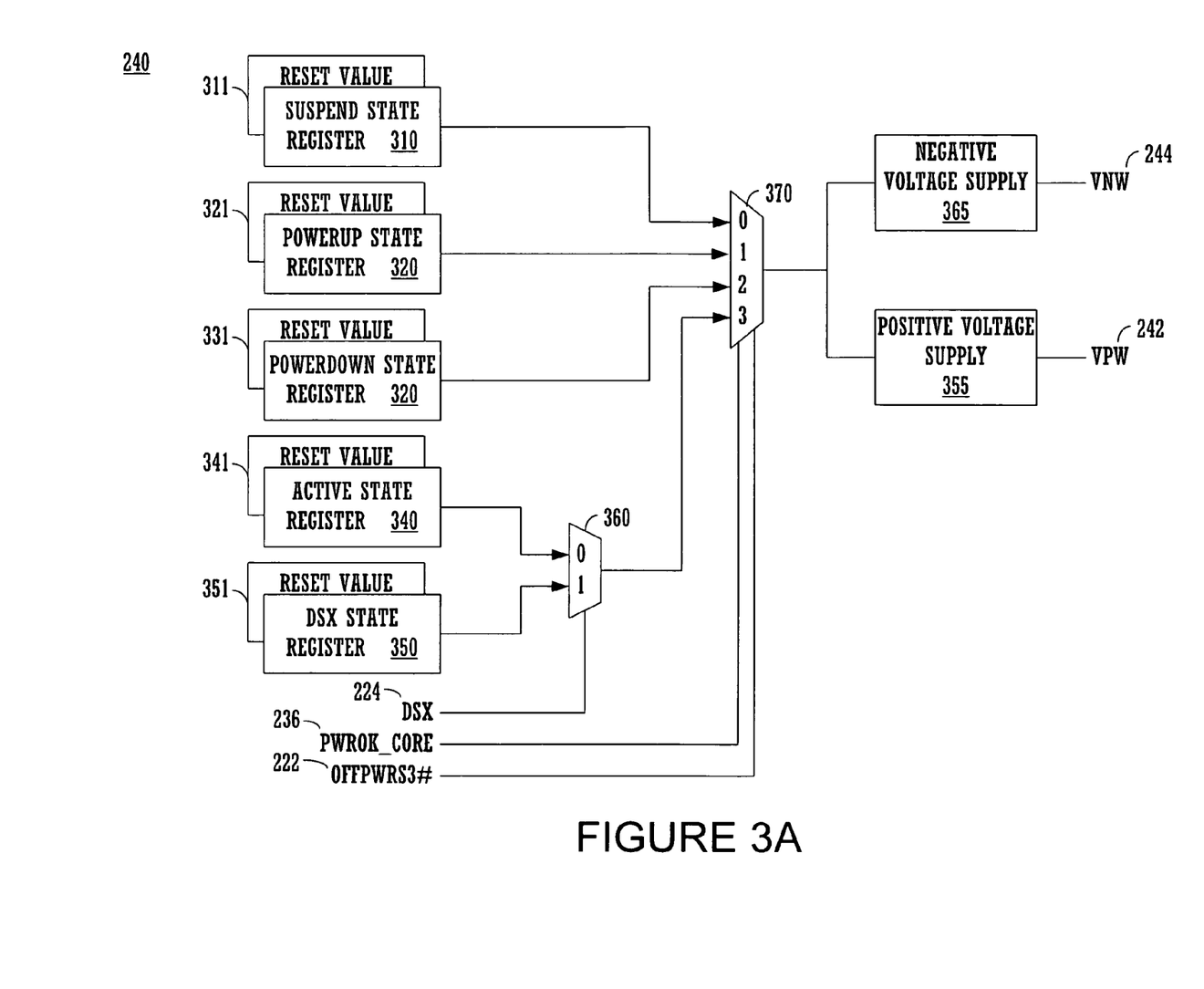
FIG. 3A illustrates a portion of power kernel, in accordance with embodiments of the present invention.

FIG. 3A illustrates a portion of power kernel 240, in accordance with embodiments of the present invention. It is to be appreciated that power kernel 240 is well suited to embodiment as a stand-alone integrated circuit, or within other integrated circuits of a computer system, e.g., within an integrated circuit comprising a microprocessor, e.g., microprocessor 210 (FIG. 2) in accordance with alternative embodiments of the present invention.

Referring once again to FIG. 3A, power kernel 240 comprises five state registers 310, 320, 330, 340 and 350 corresponding to the five power states suspend 140, power up 110, power down 120, active 130 and DSX 140 previously described with respect to FIG. 1. It is appreciated that embodiments of the present invention are well suited to greater or fewer power states, and correspondingly greater or fewer power state registers. These registers comprise command values utilized to control power supply outputs of power kernel 240, e.g., negative voltage supply 365 and/or positive voltage supply 355, to produce desirable body biasing voltages, e.g., Vnw 244 and Vnw 244, for microprocessor 210 corresponding to a particular power mode for microprocessor 210.

Negative voltage supply 365 and positive voltage supply 355 are well suited to a variety of voltage supply implementations, e.g., charge pumps or regulators, in accordance with embodiments of the present invention.

For example, consider that active state register 340 comprises 16 bits, eight bits to determine an output voltage of negative voltage supply 365 and eight bits to determine an output voltage of positive voltage supply 355. In active state 130, signal DSX 224 is not active, signal PwrOK_core 236 is active indicating that Vdd_out 234 is good and signal OFFPWRS3# 222 is true, indicating that operating voltage should be provided to microprocessor 210. The value of active state register 340 is coupled via multiplexer 360, controlled by signal DSX 224 and via multiplexer 370, controlled by signal PwrOK_core 236 and signal OFFPWRS3# 222, to negative voltage supply 365 and positive voltage supply 355.

The values within state registers 310, 320, 330, 340 and 350 can be changed by microprocessor 210 and/or other elements of computer system portion 200, e.g., power controller 200. However, each state register is provided with a default or reset value, 311, 321, 331, 344 and 351 corresponding to state registers 310, 320, 330, 340 and 350. These default values provide bit values corresponding to acceptable body biasing voltages for microprocessor 210 corresponding to the five power states suspend 140, power up 110, power down 120, active 130 and DSX 140. These default values determine the body biasing voltages prior to any overriding values established by microprocessor 210, e.g., via channel LPC 212 (FIG. 2).

Figure 3B:
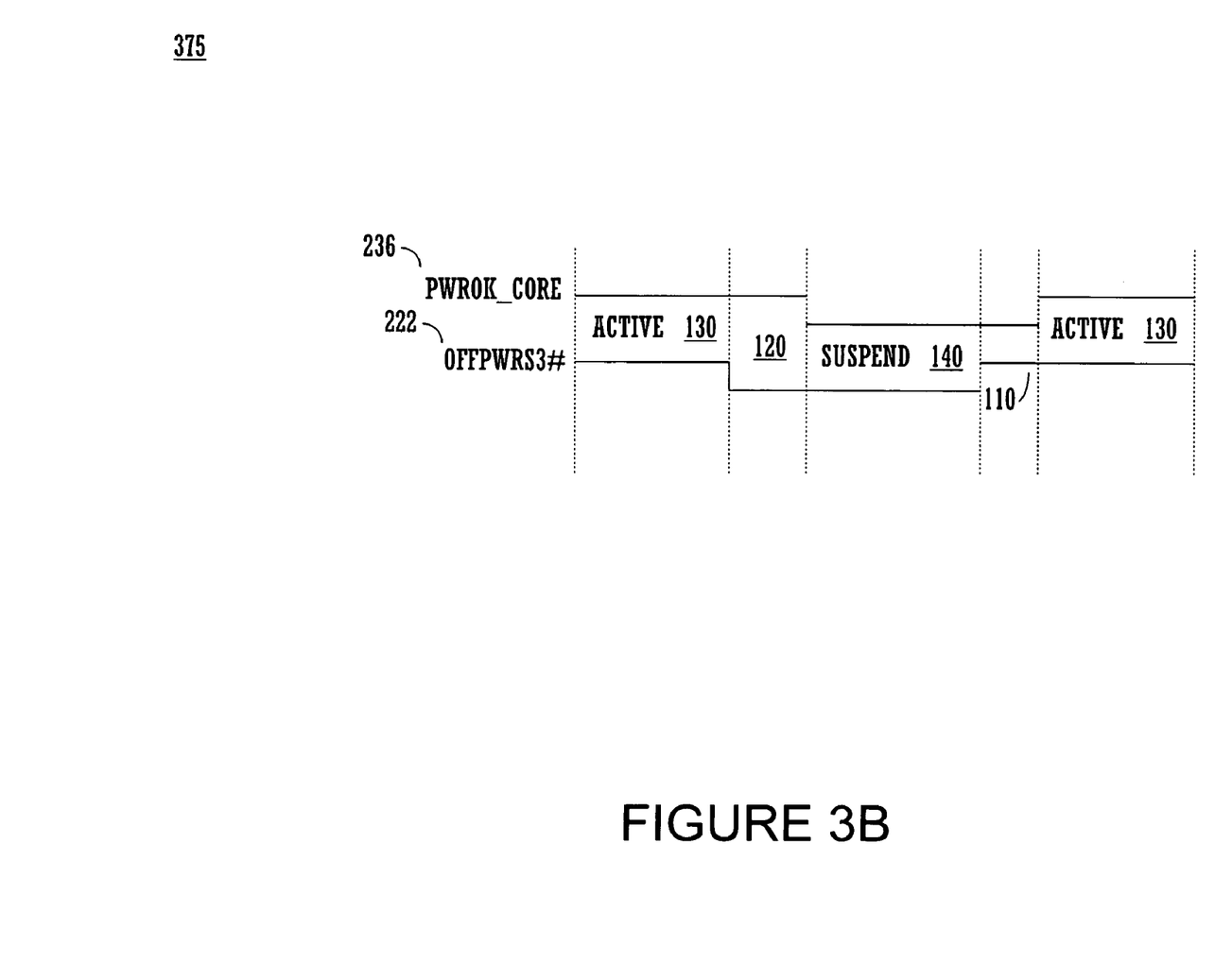
FIG. 3B is a timing diagram illustrating determination of several power states, in accordance with embodiments of the present invention.

FIG. 3B is a timing diagram 375 illustrating determination of several power states, in accordance with embodiments of the present invention. In the first portion of timing diagram 375, signal OFFPWRS3# 222 is high and signal PwrOK_core 236 is also high. When signal DSX 224 is inactive, this combination determines power state active 130. In this state, the contents of active state register 350 determine, via multiplexers 360 and 370, body-biasing voltages for microprocessor 210.

In the second portion of timing diagram 375, signal OFFPWRS3# 222 is low and signal PwrOK_core 236 is high. This combination determines power state power down 120. For example, a high value of signal PwrOK_core 236 indicates that power is still good, however a low value of signal OFFPWRS3# 222 indicates that power is to be removed. In this state, the contents of power down state register 330 determine, via multiplexers 360 and 370, body-biasing voltages for microprocessor 210.

In the third portion of timing diagram 375, signal OFFPWRS3# 222 is low and signal PwrOK_core 236 is also low. This combination determines power state suspend 140. For example, a low value of signal PwrOK_core 236 indicates that power has been removed, while a low value of signal OFFPWRS3# 222 indicates that power should have been removed. In this state, the contents of suspend state register 310 determine, via multiplexers 360 and 370, body biasing voltages for microprocessor 210.

In the fourth portion of timing diagram 375, signal OFFPWRS3# 222 is high and signal PwrOK_core 236 is low. This combination determines power state power up 110. For example, a low value of signal PwrOK_core 236 indicates that power has been removed, or does not meet operating specifications. However, a high value of signal OFFPWRS3# 222 indicates that power is to be restored. In this state, the contents of power up state register 320 determine, via multiplexers 360 and 370, body biasing voltages for microprocessor 210.

In the fifth portion of timing diagram 375, signal OFFPWRS3# 222 is high and signal PwrOK_core 236 is also high. When signal DSX 224 is inactive, this combination determines power state active 130. In this state, the contents of active state register 350 determine, via multiplexers 360 and 370, body-biasing voltages for microprocessor 210.

Figure 4:
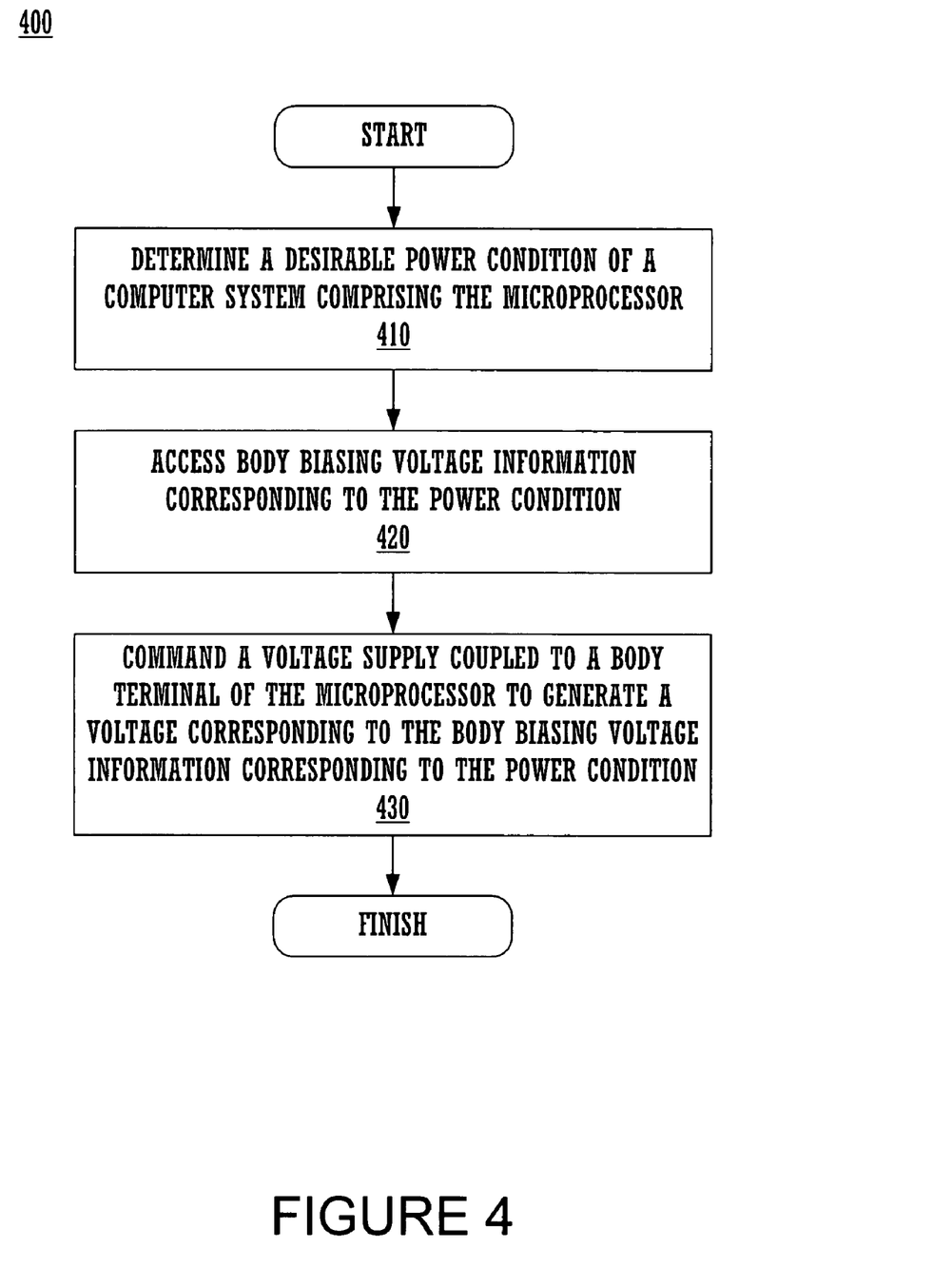
FIG. 4 is a flow chart of a method for determining a body biasing voltage applied to a microprocessor, in accordance with embodiments of the present invention.

FIG. 4 is a flow chart of a method 400 for determining a body biasing voltage applied to a microprocessor, in accordance with embodiments of the present invention.

While the method of the embodiment illustrated in flow chart 400 shows specific sequences and quantity of steps, the present invention is suitable to alternative embodiments. For example, not all the steps provided for in the method are required for the present invention. Furthermore, additional operations can be added to the operations presented in the present embodiment. Likewise, the sequences of operations can be modified depending upon the application.

In 410, a desirable power condition of a computer system comprising the microprocessor is determined. For example, a method can determine that the computer system is or should be in one of the power states described with respect to FIG. 1.

In 420, body biasing voltage information corresponding to the power condition is accessed. Embodiments in accordance with the present invention are well suited to such body biasing voltage information being stored within a variety of technologies that are well known in the computing and electronic arts, for example, bulk memory, e.g., ROM, DRAM, RAM or the like, or within dedicated structures, e.g., the registers shown in FIG. 3A.

In 430, a voltage supply coupled to a body terminal of the microprocessor is commanded to generate a voltage corresponding to the body biasing voltage information corresponding to the power condition. For example, such commanding can comprise selectively coupling the body biasing voltage information to the voltage supply. Alternatively, and in accordance with embodiments of the present invention, such commanding can take the form of a computer-generated instruction to a voltage supply. For example, a second processor within a computer system can control a voltage supply coupled to body terminal(s) of the microprocessor.

It is to be appreciated that method 400 should not be implemented in software instructions implemented the microprocessor, as some power states typically are intended for desirable conditions for which the microprocessor is unable to execute software instructions, e.g., suspend state 140, DSX state 135 or power up state 110 as described with respect to FIG. 1.

It is to be appreciated that, to the extent labels of states, signals or the like in the preceding Figures and descriptions are known, the use of such known labels is exemplary and not intended to be limiting beyond the content of the present Application. For example, with reference to FIG. 2, the use of the label "LPC" for LPC channel 212 is not to be construed as limiting channel 212 to characteristics of a known LPC bus.

Embodiments in accordance with the present invention, systems and methods for control of integrated circuits comprising body-biasing systems, are thus described. While the present invention has been described in particular embodiments, it should be appreciated that the present invention should not be construed as limited by such embodiments, but rather construed according to the below claims.

What is claimed is:

1. A computer system comprising:
a plurality of data storage locations comprising body biasing voltage information corresponding to a plurality of power modes of said computer system, wherein at least one of said plurality of power modes enables operation of said computer system at at least two different clock frequencies;
a voltage supply to generate a body biasing voltage for circuitry of said computer system according to said body biasing voltage information; and
circuitry to selectively couple said body biasing voltage information from one of said plurality of data storage locations corresponding to one of said plurality of power modes to said voltage supply.

2. The system of claim 1 wherein said circuitry of said computer system comprises a microprocessor.

3. The system of claim 1 wherein said voltage supply comprises a charge pump.

4. The system of claim 1 wherein said circuitry to selectively couple comprises a multiplexer.

5. The system of claim 4 wherein said multiplexer is controlled by a power state signal generated by a southbridge.

6. The system of claim 1 further comprising a plurality of default information to initialize said plurality of data storage locations.

7. The system of claim 1 wherein said plurality of data storage locations is modifiable by a processor of said computer system.

8. The system of claim 1 wherein said circuitry to selectively couple is operable when said computer system is unable to execute software instructions.

9. A method for determining a body biasing voltage applied to a microprocessor comprising:
receiving a command to change to a different power condition of a computer system comprising said microprocessor, wherein said different power condition comprises a different said microprocessor clock frequency and/or a different said microprocessor operating voltage;
accessing body biasing voltage information corresponding to said power condition; and
commanding a voltage supply coupled to a body terminal of said microprocessor to generate a voltage corresponding to said body biasing voltage information corresponding to said power condition.

10. The method of claim 9 wherein said determining comprises accessing a plurality of signal lines from a southbridge.

11. The method of claim 10 wherein said accessing comprises at least one of said plurality of signal lines controlling a multiplexer.

12. The method of claim 9 wherein said body biasing voltage information is modifiable by said computer system.

13. The method of claim 9 operable when said microprocessor is unable to execute software instructions.

14. The method of claim 9 wherein said commanding comprises selectively coupling said body biasing voltage information to said voltage supply.

15. An integrated circuit comprising:
a plurality of registers comprising body biasing voltage information corresponding to a plurality of power modes of a computer system, wherein at least one of said plurality of power modes enables operation of said computer system at at least two different clock frequencies;
a first voltage supply to generate a body biasing voltage for p-type devices of a microprocessor of said computer system according to said body biasing voltage information;
a second voltage supply to generate a body biasing voltage for n-type devices of said microprocessor of said computer system according to said body biasing voltage information; and
circuitry to selectively couple said body biasing voltage information from one of said plurality of registers corresponding to one of said plurality of power modes to said first and second voltage supplies.

16. The integrated circuit of claim 15 wherein said first voltage supply comprises a charge pump.

17. The integrated circuit of claim 15 wherein said circuitry to selectively couple comprises a multiplexer.

18. The integrated circuit of claim 17 wherein said multiplexer is controlled by a power state signal generated by a southbridge.

19. The integrated circuit of claim 15 further comprising a plurality of default information to initialize said plurality of registers.

20. The integrated circuit of claim 15 wherein said plurality of registers is modifiable by said microprocessor.

21. The integrated circuit of claim 15 wherein said circuitry to selectively couple is operable when said microprocessor is unable to execute software instructions.

* * * * *